(12) United States Patent
Eric et al.

(10) Patent No.: US 11,803,830 B2
(45) Date of Patent: Oct. 31, 2023

(54) SYSTEMS AND METHODS TO VALIDATE PURCHASE OF A PRODUCT IN A PHYSICAL STORE

(71) Applicant: Visa International Service Association, San Francisco, CA (US)

(72) Inventors: Lin Jianhui Eric, Singapore (SG); Leow YanGen Harris, Singapore (SG)

(73) Assignee: Visa International Service Association, San Francisco, CA (US)

(*) Notice: Subject to any disclaimer, the term of this patent is extended or adjusted under 35 U.S.C. 154(b) by 498 days.

(21) Appl. No.: 16/775,506

(22) Filed: Jan. 29, 2020

(65) Prior Publication Data

US 2021/0233051 A1    Jul. 29, 2021

(51) Int. Cl.
*G06Q 20/20* (2012.01)
*G08B 13/24* (2006.01)
(Continued)

(52) U.S. Cl.
CPC ......... *G06Q 20/204* (2013.01); *G06Q 10/087* (2013.01); *G06Q 20/102* (2013.01); *G07C 9/00182* (2013.01); *G08B 13/246* (2013.01); *G08B 13/2462* (2013.01); *G06Q 20/203* (2013.01); *G06Q 20/208* (2013.01); *G06Q 30/0601* (2013.01);
(Continued)

(58) Field of Classification Search
CPC ............. G07C 9/00182; G06Q 10/087; G06Q 20/204; G06Q 20/20; G06Q 20/322; G06Q 20/3278; G06Q 20/202; G06Q 20/102; G08B 13/246; G08B 13/2462
USPC .......................................................... 705/17
See application file for complete search history.

(56) References Cited

U.S. PATENT DOCUMENTS

| 2009/0322529 A1* | 12/2009 | Kangas | G08B 13/2462 |
| | | | 340/572.1 |
| 2015/0199890 A1* | 7/2015 | Hewett | G08B 13/2428 |
| | | | 340/572.1 |

(Continued)

FOREIGN PATENT DOCUMENTS

GB          2548992    *    4/2017

OTHER PUBLICATIONS

Albrecht, Katherine. "Supermarket "Loyalty" Cards and Consumer Privacy Education: An Examination into Consumer Knowledge about Cards' Data Collection Function." A Thesis to the Faculty of the Graduate School of Education of Harvard University, 2006. (Year: 2006).*

(Continued)

*Primary Examiner* — Nathan C Uber
*Assistant Examiner* — Fawaad Haider
(74) *Attorney, Agent, or Firm* — THE WEBB LAW FIRM

(57) ABSTRACT

Embodiments of the present disclosure relates to systems and methods for validating purchase of a product in a physical store. For the validation, a confirmation data for a payment for the product and a product Identification Detail (ID) associated with the product is received upon purchase of the product by a user in a physical store. Upon receiving the confirmation data and the product ID, an inventory database of the physical store is updated with the confirmation data and the product ID for the purchased product. The purchase is validated using the product ID and the updated inventory database when the user is exiting the physical store.

12 Claims, 11 Drawing Sheets

(51) Int. Cl.
*G06Q 20/10* (2012.01)
*G07C 9/00* (2020.01)
*G06Q 10/087* (2023.01)
*G06Q 30/0601* (2023.01)
*G07G 1/00* (2006.01)

(52) U.S. Cl.
CPC . *G07C 2009/00293* (2013.01); *G07G 1/0045* (2013.01); *G08B 13/2417* (2013.01)

(56) References Cited

U.S. PATENT DOCUMENTS

2018/0096331 A1* 4/2018 Patil ............... G08B 13/246
2021/0020012 A1* 1/2021 Shakedd ............ G06K 19/0708

OTHER PUBLICATIONS

Forehand, Kevin A. Exploring Wal-Mart Customer Acceptance of Radio Frequency Identification Technology at the Point-of-Sale: A Case Study. Northcentral University. ProQuest Dissertations Publishing, 2017. (Year: 2017).*
Cheng, Kuei-Mei. An Evaluation Of RFID Door Security System At Taipei Arena Ice Land Based On Technology Acceptance Model. International Journal of Management & Information Systems (Online); Littleton vol. 17, Iss. 2, (2013): 117. (Year: 2013).*

* cited by examiner ized non-limiting embodiments or aspects of the present disclosure may be implemented. As shown in FIG. 1, environment 100 includes cashier-less system 102, communication network 104, merchant system 106, user device 108, and/or database 110.

SYSTEMS AND METHODS TO VALIDATE PURCHASE OF A PRODUCT IN A PHYSICAL STORE

BACKGROUND

1. Technical Field

The present disclosure relates generally to security systems for physical stores and more specifically, but not particularly, to systems and methods to validate purchase of a product in a physical store.

2. Technical Considerations

Currently, in a typical cashier-less physical store, consumers are allowed to take products to be purchased from shelves, and then pay electronically, such that the consumers may leave the physical store without physically checking out. Such physical stores may be leveraged with cameras or sensors to track shoppers to reduce the instances of crimes, shoplifting, and thefts in the physical stores.

Large retailers often install sophisticated systems in the physical stores for tracking and providing a secure shopping environment. These systems include multiple advanced facial and behavioral recognition security cameras that track the behavior of customers/shoppers. However, the interior design of the entire physical store needs to be enhanced to support such advanced and sophisticated systems to prevent any blind spots. Hence, implementation of such systems in the physical stores may turn out to be an expensive setup. Also, integration of currently available self-checkout solutions with an inventory management system of the physical store is a challenging task. Further, payment systems in such physical stores may not be fully interoperable with payment wallets and smart payment methods. Security concerns continue to exist in such physical stores, preventing cashier-less stores from proliferating.

The information disclosed in this background of the disclosure section is only for enhancement of understanding of the general background of the disclosure and should not be taken as an acknowledgement or any form of suggestion that this information forms existing information already known to a person skilled in the art.

SUMMARY

Additional features and advantages are realized through the techniques of the present disclosure. Other embodiments and aspects of the disclosure are described in detail herein and are considered a part of the claimed disclosure.

In some non-limiting embodiments or aspects, provided is a computer-implemented method, comprising: in response to a purchase of a product by a user in a physical store, receiving, with at least one processor, confirmation data for a payment for the product and a product Identification Detail (ID) associated with the product; updating, with at least one processor, an inventory database of the physical store with the confirmation data and the product ID for the purchased product; and validating, with at least one processor, the purchase using the product ID and the updated inventory database, when the user is exiting the physical store.

In some non-limiting embodiments or aspects, receiving the confirmation data and the product ID comprises: scanning, with at least one processor, a computer-readable code associated with the product using a payment system for initiating payment for the purchase of the product and retrieving the product ID embedded in the computer-readable code; and processing, with at least one processor, the payment of the product using the payment system, wherein the payment system generates the confirmation data in response to authorization of the payment. In some non-limiting embodiments or aspects, validating the purchase comprises: determining, with at least one processor, the product ID from the product using a tracker system while the user is exiting the physical store; comparing, with at least one processor, the product ID received from the tracker system with the product ID updated along with the confirmation data in the inventory database; and in response to the comparison, determining, with at least one processor, the purchase to be one of a valid purchase or an invalid purchase. In some non-limiting embodiments or aspects, determining the purchase to be the valid purchase comprises disabling, with at least one processor, a security system configured to restrict the user from exiting the physical store. In some non-limiting embodiments or aspects, determining the purchase to be the invalid purchase comprises enabling, with at least one processor, a security system configured to restrict the user from exiting the physical store. In some non-limiting embodiments or aspects, determining the purchase to be the invalid purchase comprises providing, with at least one processor, a notification related to the invalid purchase using at least one of an alarm system in the physical store and user equipment. In some non-limiting embodiments or aspects, obtaining the product ID using the tracker system comprises scanning, with a scanner of the tracker system, a tag associated with the product to obtain the product ID embedded in the tag.

In some non-limiting embodiments or aspects, provided is a system, comprising: one or more processors; and a memory communicatively coupled to the one or more processors, wherein the memory stores processor-executable instructions, which, on execution, cause the one or more processors to: in response to a purchase of a product by a user in a physical store, receive confirmation data for a payment for a product and a product Identification Detail (ID) associated with the product; update an inventory database of the physical store with the confirmation data and the product ID for the purchased product; and validate the purchase using the product ID and the updated inventory database when the user is exiting the physical store.

In some non-limiting embodiments or aspects, the one or more processors are configured to receive the confirmation data and the product ID by: scanning a computer-readable code associated with the product using a payment system for initiating payment for the purchase of the product and retrieving the product ID embedded in the computer-readable code; and processing the payment of the product using the payment system, wherein the payment system generates the confirmation data in response to authorization of the payment. In some non-limiting embodiments or aspects, the one or more processors are configured to validate the purchase by: determining the product ID from the product using a tracker system while the user is exiting the physical store; comparing the product ID obtained via the tracker system with the product ID updated along with the confirmation data in the inventory database; and in response to the comparison, determining the purchase to be one of a valid purchase or an invalid purchase. In some non-limiting embodiments or aspects, the one or more processors are configured to disable a security system configured to restrict the user from exiting the physical store when the purchase is determined to be the valid purchase. In some non-limiting embodiments or aspects, the one or more processors are configured to enable a security system configured to restrict the user from exiting the physical store when the purchase is determined to be the invalid purchase. In some non-limiting embodiments or aspects, the one or more processors are configured to provide a notification related to the invalid purchase using at least one of an alarm system in the physical store and user equipment when the purchase is determined to be the invalid purchase. In some non-limiting embodiments or aspects, the one or more processors are configured to obtain the product ID using the tracker system by scanning a tag associated with the product using a scanner of the tracker system to obtain the product ID embedded in the tag.

In some non-limiting embodiments or aspects, provided is a non-transitory computer-readable medium including instructions stored thereon that when processed by one or more processors cause a system to perform operations comprising: in response to a purchase of a product by a user in a physical store, receiving, with at least one processor, confirmation data for a payment for the product and a product Identification Detail (ID) associated with the product; updating, with at least one processor, an inventory database of the physical store with the confirmation data and the product ID for the purchased product; and validating, with at least one processor, the purchase using the product ID and the updated inventory database when the user is exiting the physical store.

In some non-limiting embodiments or aspects, receiving the confirmation data and the product ID comprises: scanning a computer-readable code associated with the product using a payment system for initiating payment for the purchase of the product and retrieving the product ID embedded in the computer-readable code; and processing the payment of the product using the payment system, wherein the payment system generates the confirmation data in response to authorization of the payment. In some non-limiting embodiments or aspects, validating the purchase comprises: determining the product ID from the product using a tracker system while the user is exiting the physical store; comparing the product ID obtained via the tracker system with the product ID updated along with the confirmation data in the inventory database; and in response to the comparison, determining the purchase to be one of a valid purchase or an invalid purchase. In some non-limiting embodiments or aspects, determining the purchase to be a valid purchase comprises disabling a security system configured to restrict the user from exiting the physical store, wherein determining the purchase to be an invalid purchase comprises enabling a security system configured to restrict the user from exiting the physical store. In some non-limiting embodiments or aspects, determining the purchase to be the invalid purchase comprises providing a notification related to the invalid purchase using at least one of an alarm system in the physical store and user equipment. In some non-limiting embodiments or aspects, obtaining the product ID using the tracker system comprises scanning a tag associated with the product using a scanner of the tracker system to obtain the product ID embedded in the tag.

Further non-limiting embodiments or aspects are set forth in the following numbered clauses.

Clause 1: A computer-implemented method, comprising: in response to a purchase of a product by a user in a physical store, receiving, with at least one processor, confirmation data for a payment for the product and a product Identification Detail (ID) associated with the product; updating, with at least one processor, an inventory database of the physical store with the confirmation data and the product ID for the purchased product; and validating, with at least one processor, the purchase using the product ID and the updated inventory database when the user is exiting the physical store.

Clause 2: The computer-implemented method of clause 1, wherein receiving the confirmation data and the product ID comprises: scanning, with at least one processor, a computer-readable code associated with the product using a payment system for initiating payment for the purchase of the product and retrieving the product ID embedded in the computer-readable code; and processing, with at least one processor, the payment of the product using the payment system, wherein the payment system generates the confirmation data in response to authorization of the payment.

Clause 3: The computer-implemented method of clause 1 or 2, wherein validating the purchase comprises: determining, with at least one processor, the product ID from the product using a tracker system while the user is exiting the physical store; comparing, with at least one processor, the product ID received from the tracker system with the product ID updated along with the confirmation data in the inventory database; and in response to the comparison, determining, with at least one processor, the purchase to be one of a valid purchase or an invalid purchase.

Clause 4: The computer-implemented method of any of clauses 1-3, wherein determining the purchase to be the valid purchase comprises disabling, with at least one processor, a security system configured to restrict the user from exiting the physical store.

Clause 5: The computer-implemented method of any of clauses 1-4, wherein determining the purchase to be the invalid purchase comprises enabling, with at least one processor, a security system configured to restrict the user from exiting the physical store.

Clause 6: The computer-implemented method of any of clauses 1-5, wherein determining the purchase to be the invalid purchase comprises providing, with at least one processor, a notification related to the invalid purchase using at least one of an alarm system in the physical store and user equipment.

Clause 7: The computer-implemented method of any of clauses 1-7, wherein obtaining the product ID using the tracker system comprises scanning, with a scanner of the tracker system, a tag associated with the product to obtain the product ID embedded in the tag.

Clause 8: A system, comprising: one or more processors; and a memory communicatively coupled to the one or more processors, wherein the memory stores processor-executable instructions, which, on execution, cause the one or more processors to: in response to a purchase of a product by a user in a physical store, receive confirmation data for a payment for a product and a product Identification Detail (ID) associated with the product; update an inventory database of the physical store with the confirmation data and the product ID for the purchased product; and validate the purchase using the product ID and the updated inventory database when the user is exiting the physical store.

Clause 9: The system of clause 8, wherein the one or more processors are configured to receive the confirmation data and the product ID by: scanning a computer-readable code associated with the product using a payment system for initiating payment for the purchase of the product and retrieving the product ID embedded in the computer-readable code; and processing the payment of the product using the payment system, wherein the payment system generates the confirmation data in response to authorization of the payment.

Clause 10: The system of clause 8 or 9, wherein the one or more processors are configured to validate the purchase by: determining the product ID from the product using a tracker system while the user is exiting the physical store; comparing the product ID obtained via the tracker system with the product ID updated along with the confirmation data in the inventory database; and in response to the comparison, determining the purchase to be one of a valid purchase or an invalid purchase.

Clause 11: The system of any of clauses 8-10, wherein the one or more processors are configured to disable a security system configured to restrict the user from exiting the physical store when the purchase is determined to be the valid purchase.

Clause 12: The system of any of clauses 8-11, wherein the one or more processors are configured to enable a security system configured to restrict the user from exiting the physical store when the purchase is determined to be the invalid purchase.

Clause 13: The system of any of clauses 8-12, wherein the one or more processors are configured to provide a notification related to the invalid purchase using at least one of an alarm system in the physical store and user equipment when the purchase is determined to be the invalid purchase.

Clause 14: The system of any of clauses 8-13, wherein the one or more processors are configured to obtain the product ID using the tracker system by scanning a tag associated with the product using a scanner of the tracker system to obtain the product ID embedded in the tag.

Clause 15: A non-transitory computer-readable medium including instructions stored thereon that when processed by one or more processors cause a system to perform operations comprising: in response to a purchase of a product by a user in a physical store, receiving, with at least one processor, confirmation data for a payment for the product and a product Identification Detail (ID) associated with the product; updating, with at least one processor, an inventory database of the physical store with the confirmation data and the product ID for the purchased product; and validating, with at least one processor, the purchase using the product ID and the updated inventory database when the user is exiting the physical store.

Clause 16: The medium of clause 15, wherein receiving the confirmation data and the product ID comprises: scanning a computer-readable code associated with the product using a payment system for initiating payment for the purchase of the product and retrieving the product ID embedded in the computer-readable code; and processing the payment of the product using the payment system, wherein the payment system generates the confirmation data in response to authorization of the payment.

Clause 17: The medium of clause 15 or 16, wherein validating the purchase comprises: determining the product ID from the product using a tracker system while the user is exiting the physical store; comparing the product ID obtained via the tracker system with the product ID updated along with the confirmation data in the inventory database; and in response to the comparison, determining the purchase to be one of a valid purchase or an invalid purchase.

Clause 18: The medium of any of clauses 15-17, wherein determining the purchase to be a valid purchase comprises disabling a security system configured to restrict the user from exiting the physical store, and wherein determining the purchase to be an invalid purchase comprises enabling a security system configured to restrict the user from exiting the physical store.

Clause 19: The medium of any of clauses 15-18, wherein determining the purchase to be the invalid purchase comprises providing a notification related to the invalid purchase using at least one of an alarm system in the physical store and user equipment.

Clause 20: The medium of any of clauses 15-19, wherein obtaining the product ID using the tracker system comprises scanning a tag associated with the product using a scanner of the tracker system to obtain the product ID embedded in the tag.

In some non-limiting embodiments or aspects, the present disclosure relates to a computer-implemented method for validating purchase of a product in a physical store. For the validation, confirmation data for a payment for the product and a product Identification Detail (ID) associated with the product is received upon purchase of the product by a user in a physical store. Upon receiving the confirmation data and the product ID, an inventory database of the physical store is updated with the confirmation data and the product ID for the purchased product. The purchase is validated using the product ID and the updated inventory database when the user is exiting the physical store.

In some non-limiting embodiments or aspects, the present disclosure relates to a system for validating purchase of a product in a physical store. The system includes a processor and a memory communicatively coupled to the processor. The memory stores processor-executable instructions, which on execution cause the processor to validate the purchase. For the validation, the system is configured to receive a confirmation data for a payment for the product and a product ID associated with the product upon purchase of the product by a user in the physical store. Upon receiving the confirmation data and the product ID, the system is configured to update an inventory database of the physical store with the confirmation data and the product ID for the purchased product. The system validates the purchase using the product ID and the updated inventory database when the user is exiting the physical store.

In some non-limiting embodiments or aspects, the present disclosure relates to non-transitory computer-readable medium including instructions stored. The instructions when processed by at least one processor cause a device to validate purchase of a product in a physical store. For the validation, confirmation data for a payment for the product and a product ID associated with the product is received upon purchase of the product by a user in a physical store. Upon receiving the confirmation data and the product ID, an inventory database of the physical store is updated with the confirmation data and the product ID for the purchased product. The purchase is validated using the product ID and the updated inventory database when the user is exiting the physical store.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures, wherein like reference numerals represent like elements and in which:

Figure 1:
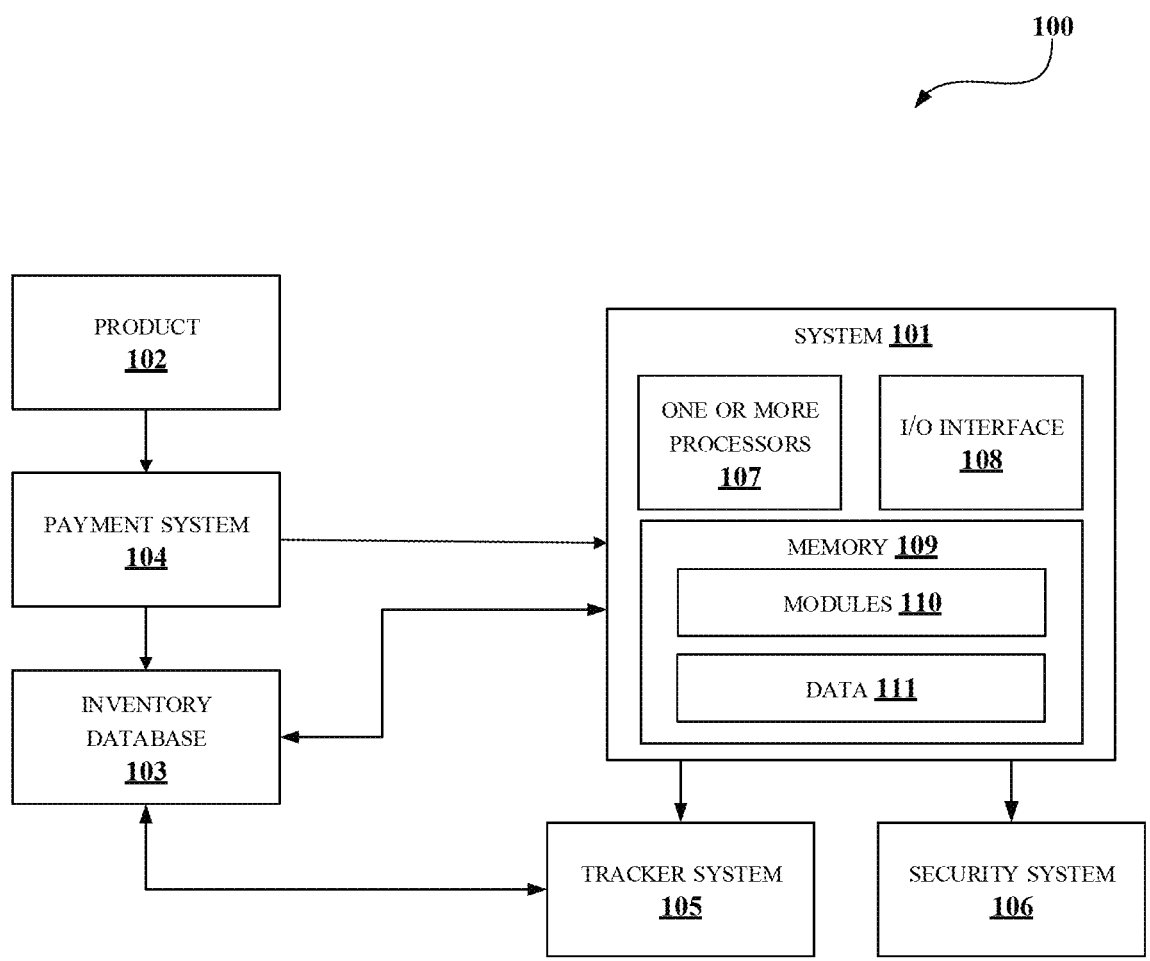
FIG. 1 an shows exemplary environment of a system for validating a purchase of a product in a physical store, in accordance with some non-limiting embodiments or aspects of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in a computer-readable medium and executed by a computer or processor, whether such computer or processor is explicitly shown.

DETAILED DESCRIPTION

In the present document, the term "exemplary" is used herein to mean "serving as an example, instance, or illustration." Any embodiment or implementation of the present subject matter described herein as "exemplary" is not necessarily to be construed as preferred or advantageous over other embodiments.

In the following detailed description of the embodiments of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by "comprises . . . a" does not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" does not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices or computing units, such as processors, storage devices, and/or similar computer components, that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but is not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The present disclosure relates to methods and systems for validating a purchase of a product in a physical store. The system is integrated with inventory databases, payment systems, and tracker systems of the physical store such that easy payment is provided without compromising security in the physical store. Each product in the physical store is associated with a product Identification Detail (ID). The product ID is used to confirm payment for the product, update the inventory database, and validate the purchase when a user, who has purchased the product, exits the store. By the proposed method and system, a secure purchase of the product is provided without the need for a cashier in the physical store and/or expensive sensor systems.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment 100 of a system 101 for validating a purchase of a product 102 in a physical store, in accordance with some non-limiting embodiments or aspects of the present disclosure. The environment 100 may include the system 101 in communication with a payment system 104, an inventory database 103, a tracker system 105, and a security system 106. The exemplary environment 100 may be the environment of a physical store with a plurality of products to be purchased by a customer. The physical store may be a shopping channel where consumers need to visit the store in person to perform shopping activities, e.g., purchase of one or more products available in the store. The physical store may be a retail store or a wholesale store. For example, the physical store may be a clothing store, a grocery, an electronics store, a supermarket, an accessory store, and the like. In some non-limiting embodiments or aspects, the proposed system 101 may be implemented in a physical store, which operates without a cashier handling a cash register at the store. In such a physical store, the customer (also referred to as a user) may purchase one or more products using payment systems available in user devices. For example, the user may initiate purchase of a product 102 using a digital wallet in a mobile phone of the user. Upon purchase of the product 102 using such payment systems, the user may exit the store with the purchased product. The system 101 may be configured to validate the purchase of the product 102 purchased by the user, while the user is exiting the physical store.

The system 101 may include one or more processors 107, an Input/Output (I/O) interface 108, and a memory 109. In some non-limiting embodiments or aspects, the memory 109 may be communicatively coupled to the one or more processors 107. The memory 109 stores instructions, executable by the one or more processors 107, which on execution, may cause the system 101 to identify the entity (and/or implement the method) as described in the present disclosure. In some non-limiting embodiments or aspects, the memory 109 may include one or more modules 110 and data 111. The one or more modules 110 may be configured to perform the steps of the present disclosure using the data 111 to validate the purchase of the product 102. In some non-limiting embodiments or aspects, each of the one or more modules 110 may be a hardware unit, which may be outside the memory 109 and coupled with the system 101. In some non-limiting embodiments or aspects, the system 101 may be implemented in a variety of computing systems, such as a laptop computer, a desktop computer, a Personal Computer (PC), a notebook, a smartphone, a tablet, e-book readers, a server, a network server, a cloud server, and the like.

The system 101 may be in communication with at least one of the payment system 104, the inventory database 103, the tracker system 105, and the security system 106 for validating the purchase of the product 102. In some non-limiting embodiments or aspects, the system 101 may communicate with at least one of the payment system 104, the inventory database 103, the tracker system 105, and the security system 106 via a communication network (not shown in the figure). The communication network may include, without limitation, a direct interconnection, a Local Area Network (LAN), a Wide Area Network (WAN), a wireless network (e.g., using Wireless Application Protocol), the Internet, and the like. In some non-limiting embodiments or aspects, a dedicated communication network may be implemented to establish communication between the system 101 and each of the payment system 104, the inventory database 103, the tracker system 105, and the security system 106.

For validating the purchase using the proposed system 101, each of the plurality of products in the physical store may be associated with a product ID. In some non-limiting embodiments or aspects, the product ID for each of the plurality of products may be generated by the system 101 before placing the plurality of products on the shelves of the physical store. The generated product ID may be stored in the inventory database 103 of the physical store. In some non-limiting embodiments or aspects, for a particular product, the product ID may be embedded in at least one of a computer-readable code or tag, printed, or attached on the product 102. The computer-readable code or the tag may be attached on the package of the product or the price tag of the product 102. Each of the plurality of products may include at least one or more computer-readable codes and one or more tags, where each of the one or more computer-readable codes and each of the one or more tags are embedded with the product ID.

The inventory database 103 may be a storage system dedicated for managing inventory of the physical store. The inventory database 103 may include information associated with the plurality of products in the physical store. The information may include, but is not limited to, incoming details, storage details, quantity details, purchase details, the product IDs, and the like associated with the plurality of products in the physical store. The inventory database 103 may be part of a computer system or a dedicated server associated with the physical store. In some non-limiting embodiments or aspects, the inventory database 103 may be part of a cloud-based server for managing the inventory of the physical store. In some non-limiting embodiments or aspects, the inventory database 103 may be dedicated to a plurality of physical stores for managing inventory of plurality of physical stores.

For purchasing the product 102 from the plurality of products, a user in the physical store may initiate a payment for the product 102 using the payment system 104 and the computer-readable code of the product 102. The payment system 104 may be any system that is programmed or configured to settle financial transactions through the transfer of monetary value. In some non-limiting embodiments or aspects, the payment system 104 may include, but is not limited to, at least one of an issuer system, a payment network, an acquirer system, a payment gateway, a merchant system, and the like. With the help of an application associated with the payment system 104, the user may scan the computer-readable code to initiate the payment. The application may implement an image processing system configured to extract the product ID from the computer-readable code and other information required for initiating the payment for the product 102. In some non-limiting embodiments or aspects, the application may be a digital wallet associated with the issuer system. One or more other applications, known to a person skilled in the art, may be implemented to extract the product ID and initiate the payment for the product 102.

When the payment is initiated, the payment system 104 may be configured to process the payment, authorize the payment for the purchase of the product 102, and complete transaction of the payment. In some non-limiting embodiments or aspects, the payment system 104 may be configured to generate confirmation data in response to authorization of the payment. In some non-limiting embodiments or aspects, the confirmation data may be generated by the payment system 104 upon completion of the transaction. The system 101 is configured to receive the confirmation data along with the product ID from the payment system 104 upon purchase of the product 102 by the user.

Upon receiving the confirmation data and the product ID, the system 101 may be configured to update the inventory database 103 of the physical store. The inventory database 103 may be updated with the confirmation data and the product ID for the purchased product. In some non-limiting embodiments or aspects, and by this updating, the inventory database 103 may record the product 102 to be purchased by the user. When the user is purchasing multiple products, the user may initiate payment for each of the multiple products via the payment system 104. For each product, and upon authorization or completion of a transaction, the confirmation data and the product ID may be received by the system 101. The system 101 may be configured to update the inventory database 103 with the confirmation data and the product ID for each of the multiple products.

When the user is exiting the store with the purchased product or products, the system 101 may be configured to validate the purchase using the product ID and the updated inventory database 103. The system 101 may be configured to communicate with the tracker system 105 to validate the purchase of the product 102. The tracker system 105 may be configured to detect the products that are carried by the user when exiting the physical store. In some non-limiting embodiments or aspects, the tracker system 105 may be configured to avoid shoplifting from the physical store. In some non-limiting embodiments or aspects, the tracker system 105 may be configured to detect the product 102 by scanning the tag on the product 102. In some non-limiting embodiments or aspects, the tracker system 105 may be a Radio Frequency Identification (RFID)-based system. For such a tracker system 105, the plurality of products in the physical stores may be included with an RFID tag embedded with the respective product ID. The tracker system 105 may include a transmitter and a receiver for detecting the product 102. The transmitter may transmit RF signals on the product 102. The receiver may receive the RF signals reflected from the RFID tag. The received RF signals include information associated with the product 102. The information may be, but is not limited to, the product ID of the product. One or more other techniques may be implemented in the tracker system 105 to detect the product 102 carried by the user and obtain the product ID.

Upon obtaining the product ID of the product 102, the system 101 is configured to compare the product ID obtained via the tracker system 105 with the product ID updated along with the confirmation data in the inventory database 103. In response to the comparison, the system 101 is configured to determine the purchase to be one of a valid purchase or an invalid purchase. In some non-limiting embodiments or aspects, the system 101 is configured to check if the obtained product ID is updated with the confirmation data in the inventory database 103. When the obtained product ID is updated with the confirmation data in the inventory database 103, the system 101 determines the purchase to be a valid purchase. When the determined (and/or received, obtained, and the like) product ID is not updated with the confirmation data in the inventory database 103, the system 101 determines the purchase to be an invalid purchase.

Further, the system 101 may be connected with the security system 106 of the physical store. The security system 106 of the physical store may make provision or provide security at exiting points in the physical store. In some non-limiting embodiments or aspects, the security may be achieved by implementing an alarm unit at the exit. In some non-limiting embodiments or aspects, the security may be achieved by implementing gantry gates at the exiting points of the physical store. In some non-limiting embodiments or aspects, the system 101 may be configured to control the security system 106 based on the validation of the purchase. In some non-limiting embodiments or aspects, when the purchase is determined to be a valid purchase, the system 101 may be configured to disable the security system 106, which is configured to restrict the user from exiting the physical store. In some non-limiting embodiments or aspects, when the purchase is determined to be an invalid purchase, the system 101 may be configured to enable the security system 106 to restrict the user from exiting the physical store. In another embodiment, when the purchase is determined to be an invalid purchase, the system 101 may be configured to provide a notification related to the invalid purchase, using the alarm unit and/or user equipment. Thus, by using the security system 106, the user who is carrying the product 102 with the invalid purchase may be restricted or prevented from exiting the physical store, such that shoplifting or theft of products from the physical store may be eliminated.

In some non-limiting embodiments or aspects, the system 101 may receive data for validating the purchase via the I/O interface 108. The received data may include, but is not limited to, at least one of the product ID, the confirmation data, and the like. Also, the system 101 may transmit data for validating the purchase via the I/O interface 108. The transmitted data may include, but is not limited to, output of the validation, the product ID, and the confirmation data for updating the inventory database 103 and the like.

Figure 2:
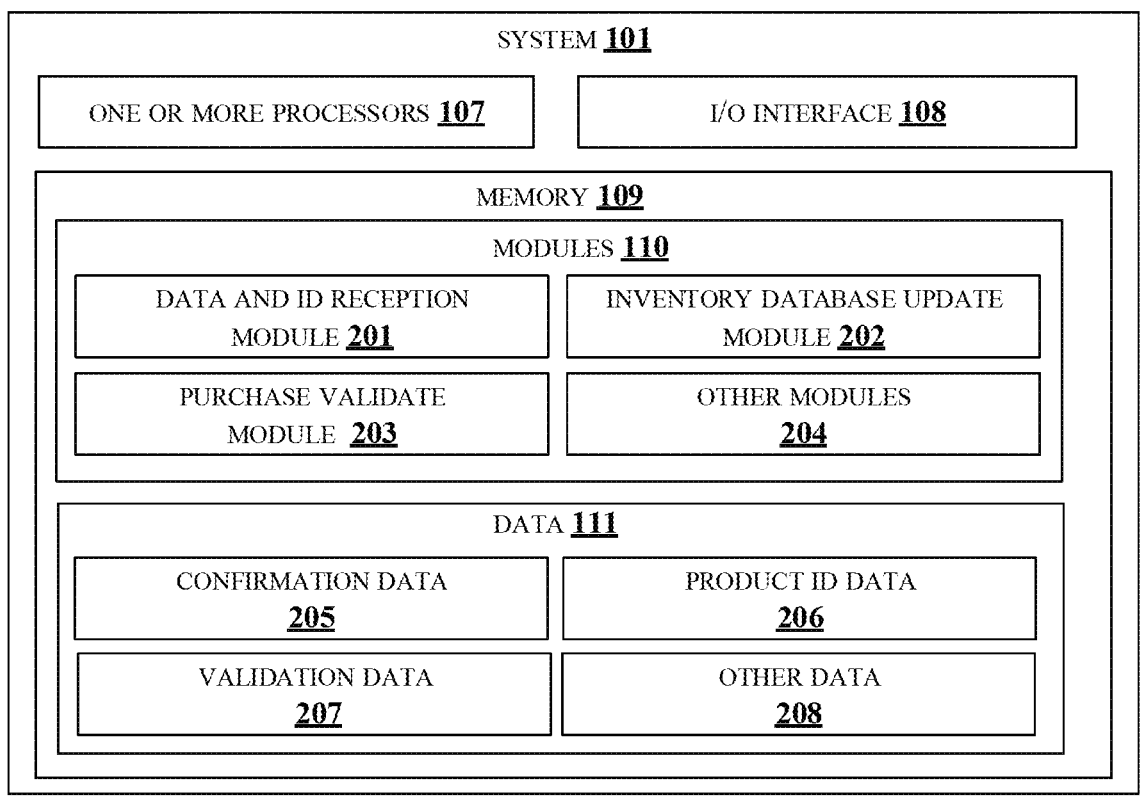
FIG. 2 shows a detailed block diagram of a system for validating a purchase of a product in a physical store, in accordance with some non-limiting embodiments or aspects of the present disclosure.

FIG. 2 shows a detailed block diagram of the system 101 for validating the purchase of the product in the physical store, in accordance with some non-limiting embodiments or aspects of the present disclosure. The data 111 and the one or more modules 110 in the memory 109 of the system 101 are described herein in detail. In one implementation, the one or more modules 110 may include, but is not limited to, a data and ID reception module 201, an inventory database update module 202, a purchase validate module 203, and one or more other modules 204 associated with the system 101. In some non-limiting embodiments or aspects, the data 111 in the memory 109 may include confirmation data 205, product ID data 206 (also referred to as product ID 206), validation data 207, and other data 208 associated with the system 101.

In some non-limiting embodiments or aspects, the data 111 in the memory 109 may be processed by the one or more modules 110 of the system 101. In some non-limiting embodiments or aspects, the one or more modules 110 may be implemented as dedicated units and when implemented in such a manner, the modules may be configured with the functionality defined in the present disclosure to result in a novel hardware. As used herein, the term module may refer to an Application Specific Integrated Circuit (ASIC), an electronic circuit, Field-Programmable Gate Arrays (FPGA), a Programmable System-on-Chip (PSoC), a combinational logic circuit, and/or other suitable components that provide the described functionality. The one or more modules 110 of the present disclosure function to validate the purchase of the product in the physical store. The one or more modules 110 along with the data 111, may be implemented in any system for the validation process.

Each of the plurality of products placed for sale in the physical store is associated with a product ID 206. The product ID 206 for each of the plurality of products may be unique. The product ID 206 may be represented with numerals, alphabets, alphanumeric, and the like. One or more techniques known to a person skilled in the art may be implemented for generating the product ID 206 for each of the plurality of products. In some non-limiting embodiments or aspects, the one or more other modules 204 of the system 101 may be configured to generate the product ID 206 for the plurality of products. In some non-limiting embodiments or aspects, the product ID 206 may be a Stock Keeping Unit (SKU) ID generated for each of the plurality of products. The SKU ID may be an identification detail which is alphanumeric and provides for the tracking of products for inventory purposes. In some non-limiting embodiments or aspects, a table may be generated for the plurality of products and stored in the inventory database 103 of the physical store. The table may include information associated with each of the plurality of products. In some non-limiting embodiments or aspects, the table may map each of the plurality of products with the corresponding product ID 206. One or more other formats of data may be used to store the plurality of products and corresponding product ID 206 in the inventory database 103.

In some non-limiting embodiments or aspects, each of the plurality of products that are purchasable by the user in the store is linked with at least one of a computer-readable code and a tag. The computer-readable code for a product may contain a data object that may be used to store a transaction reference ID required for the purchase of the product. In some non-limiting embodiments or aspects, the computer-readable code for the product includes an additional data field, which may be used to store the product ID 206. In some non-limiting embodiments or aspects, the computer-readable code may be, but is not limited to, linear codes, including barcodes, Codabar, Pharmacode, Plessey, Postnet, Telepen and the like, or matrix barcodes including QR code, CyberCode, Data Matrix, Dotcode, Maxicode Nexcode, and the like. The computer-readable code facilitates the initiation of payment for the purchase of the product. The payment may be initiated using the transaction reference ID retrieved from the computer-readable code. The tag associated with the object may be used to track or identify the object.

Figure 3A:
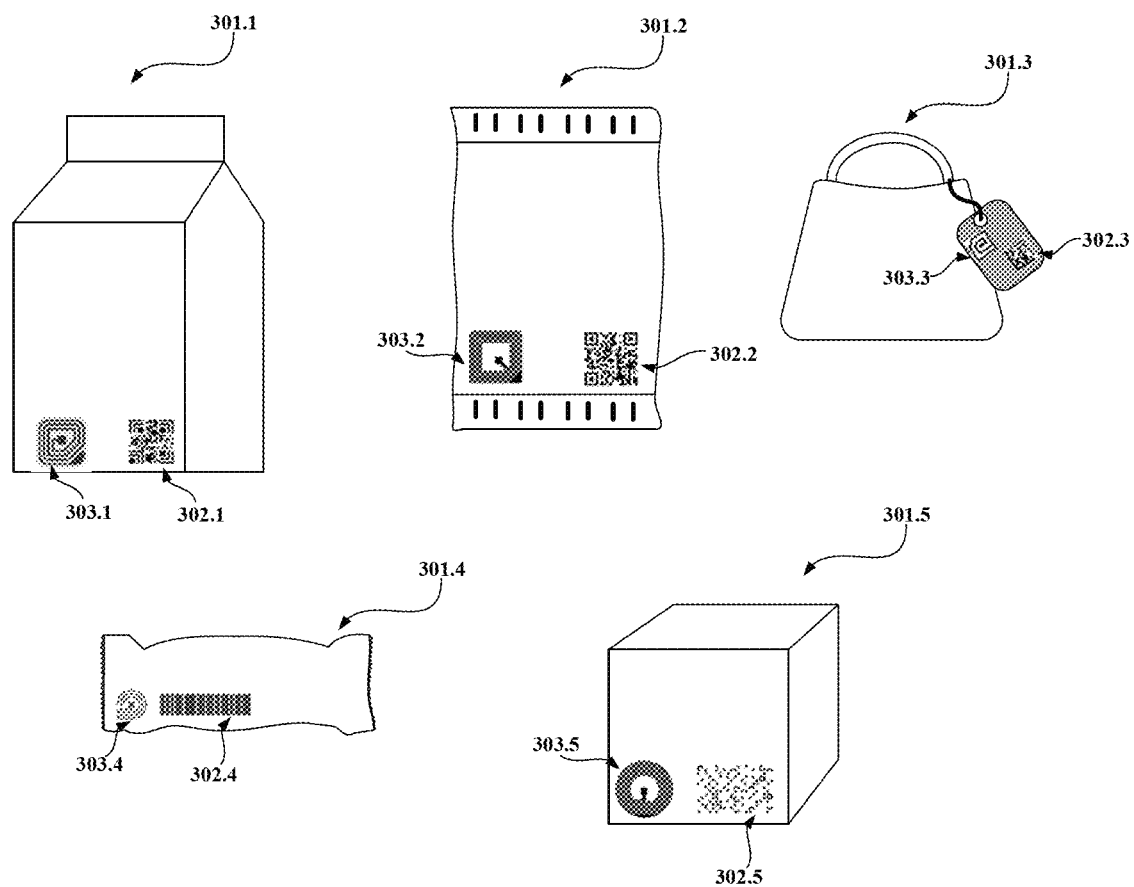
FIGS. 3a-3f illustrate exemplary embodiments for validating a purchase of a product in a physical store, in accordance with some non-limiting embodiments or aspects of present disclosure.

In some non-limiting embodiments or aspects, the tag may include electromagnetic fields to store the product ID 206 of the product. Signals projected onto the tag and the reflected signal, containing the product ID 206, may be received and processed to track the product. In some non-limiting embodiments or aspects, the tag may be an RFID tag, and an RFID based tracker system 105 may be used to track the product. In some non-limiting embodiments or aspects, the product ID may be entered manually by the user for initiating the transaction. An exemplary representation of the plurality of products in the physical store with corresponding computer-readable code and tag is shown in FIG. 3a. The plurality of products in the physical store may be labelled as a first product 301.1, a second product 301.2, a third product 301.3, a fourth product 301.4, and a fifth product 301.5. The first product 301.1 may be associated with a first product ID embedded in computer-readable code 302.1 and tag 303.1. The second product 301.2 may be associated with a second product ID embedded in computer-readable code 302.2 and tag 303.2. The third product 301.3 may be associated with a third product ID embedded in computer-readable code 302.3 and tag 303.3. The fourth product 301.4 may be associated with a fourth product ID embedded in computer-readable code 302.4 and tag 303.4. The fifth product 301.5 may be associated with a fifth product ID embedded in computer-readable code 302.5 and tag 303.5.

When the user desires to purchase a product or multiple products from the physical store, the user may initiate payment of the product using the payment system 104. In some non-limiting embodiments or aspects, the user may use interoperable wallets of the payment system 104 to initiate the payment for the product. In some non-limiting embodiments or aspects, the interoperable wallet may be associated with an issuer system managed by an issuer bank related to the payment. The user may use the interoperable wallet to scan the computer-readable code of the product that is to be purchased. In some non-limiting embodiments or aspects, the interoperable wallet may be a payment system with image processing modules. The interoperable wallet may be part of user equipment for easy scanning of the computer-readable code. For example, the interoperable wallet may be a digital wallet application installed on a smart phone of the user. Using the camera of the smart phone and the digital wallet, the computer-readable code may be scanned by the user. The image processing modules may extract the transaction reference ID and the product ID from the computer-readable code to initiate the payment.

Figure 3B:
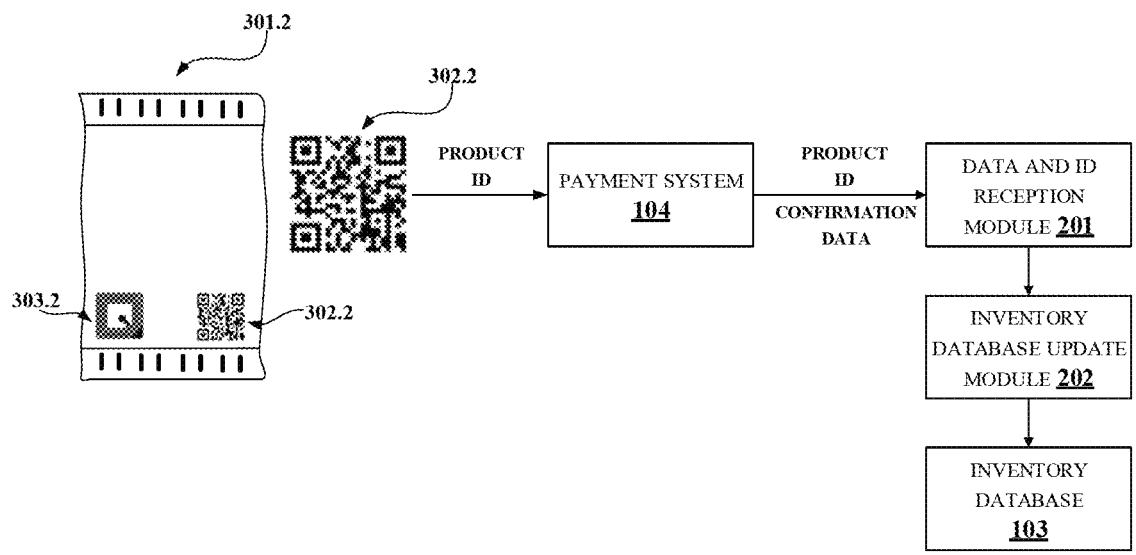

In some non-limiting embodiments or aspects, the interoperable wallet may also extract or retrieve additional information, such as the price of the product, a merchant ID, a Merchant Category Code (MCC), a merchant country, and the like, which may be required for initiating the payment. When the user wishes to purchase the second product 301.2 from the physical store, as shown in FIG. 3b, the user may use the payment system 104 and scan the computer-readable code 302.2 of the second product 301.2 to extract information required for initiating payment for the second product 301.2 and the second product ID. When the user needs to purchase more than one product, similar scanning may be performed by the user for each of the other products as well to initiate the payment for the other products. In some non-limiting embodiments or aspects, other payment processes/systems known to a person skilled in the art may be implemented to initiate the payment for the product.

Figure 3C:
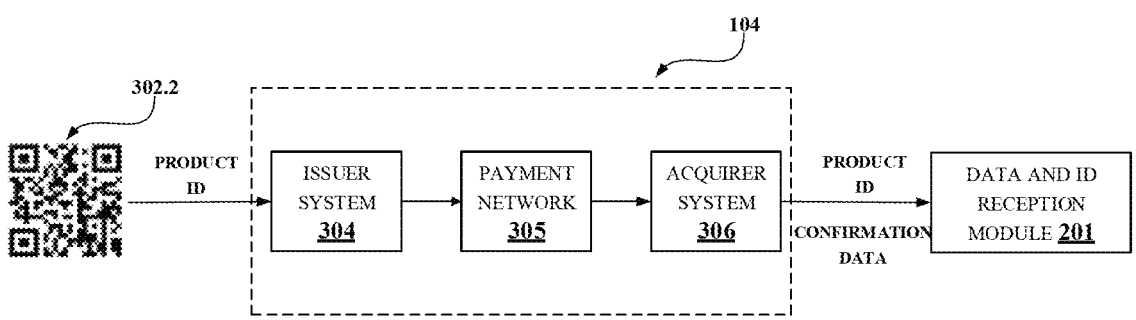

Once the payment is initiated, the payment may be processed by the payment system 104 using the extracted information from the computer-readable code. In some non-limiting embodiments or aspects, as shown in FIG. 3c, the payment system 104 may include an issuer system 304, a payment network 305, and an acquirer system 306 to process the payment for the product. In some non-limiting embodiments or aspects, the issuer system 304 may operate to authenticate and approve the payment based on the extracted information. In some non-limiting embodiments or aspects, by authenticating, the issuer system 304 may be configured to ensure that there are sufficient funds in the payment account of the user. In some non-limiting embodiments or aspects, the payment account may be associated with at least one digital wallet, card, bank account, and the like. Upon authentication, details related to authentication along with the product ID 206 may be communicated over to the payment network 305 for further processing. The payment network 305 may be configured to further authenticate the payment and route the payment to the acquirer system 306. Each merchant may be linked with a particular acquirer system. In some non-limiting embodiments or aspects, the payment network 305 may be configured to identify the acquirer system 306 associated with the merchant of the physical store and route the payment to the identified acquirer system 306. In some non-limiting embodiments or aspects, the merchant ID extracted from the computer-readable code may be used to identify the merchant and thereby identify the acquirer system 306. Along with routing the payment, the payment system 104 may also pass the product ID 206 to the acquirer system 306. In some non-limiting embodiments or aspects, the routing may be in form of a POST request.

The acquirer system 306 may be configured to validate the extracted information. Based on the validation, the acquirer system 306 may approve or decline the payment for the product. When the payment is declined by the acquirer system 306, a decline message may be passed back to the issuer system 304 via the payment network 305. When the payment is approved by the acquirer system 306, a payment acceptance message may be shared with the issuer system 304 via the payment network 305. Also, when the payment is approved, the payment may be referred to be authorized. Thus, upon authorization, the acquirer system 306 may be configured to generate the confirmation data 205 for the payment of the product.

Figure 3D:
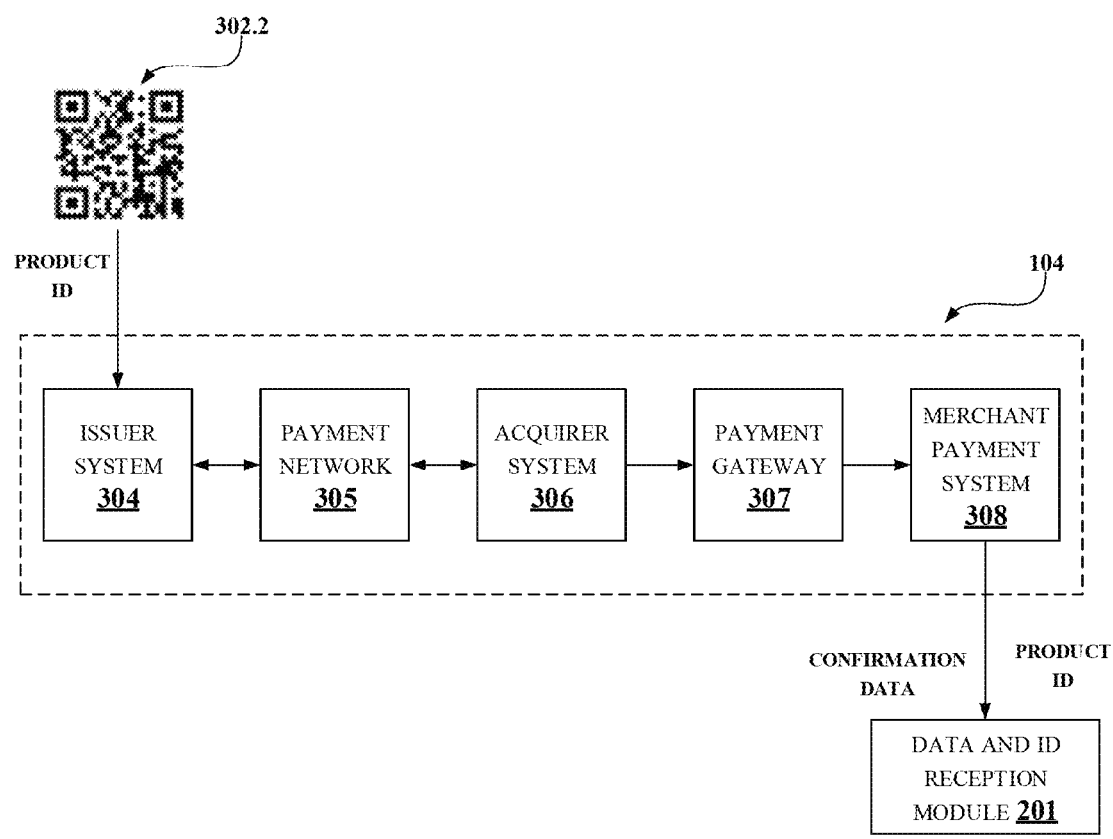
Figure 3E:
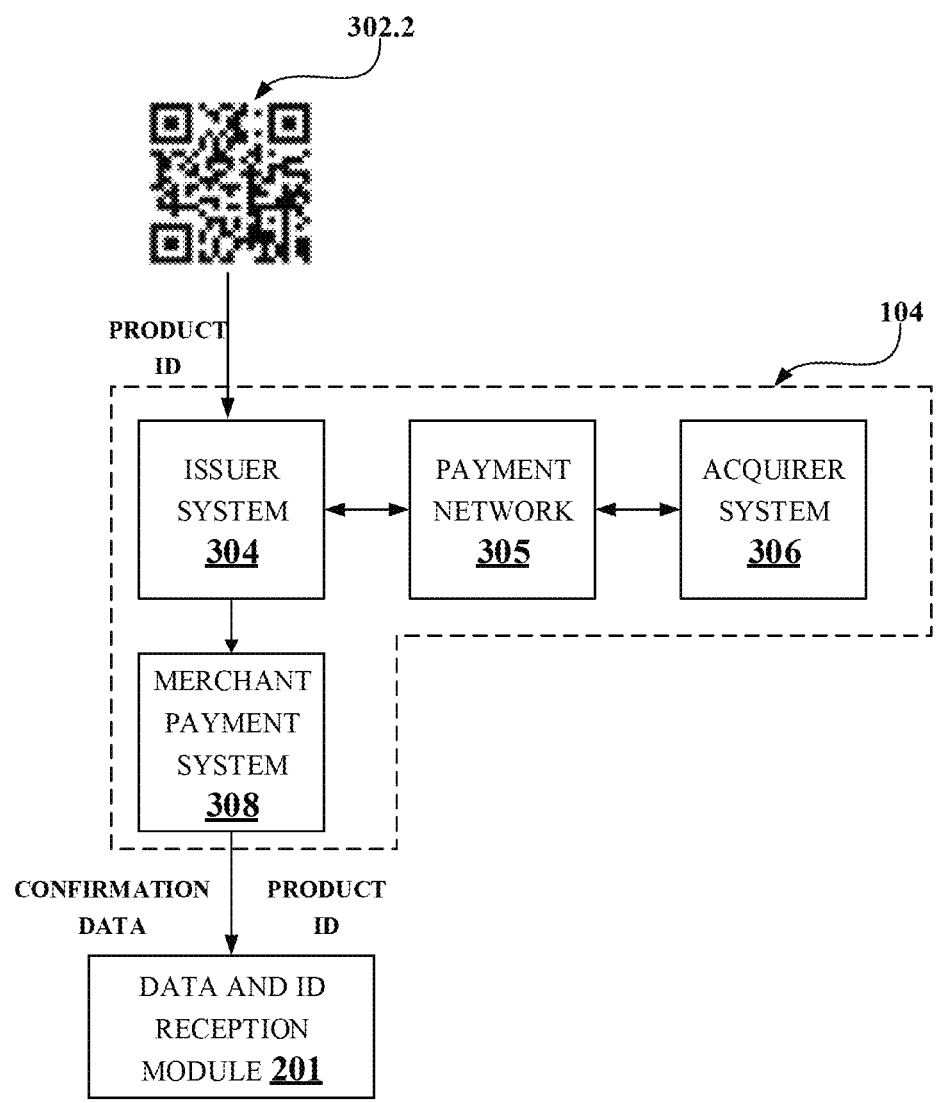

In some non-limiting embodiments or aspects, the payment system 104 may additionally include a payment gateway 307 and a merchant payment system 308, as shown in FIG. 3d. Upon authorization performed by the acquirer system 306, a message related to the authorization and the product ID 206 may be communicated to the payment gateway 307. In some non-limiting embodiments or aspects, the payment gateway 307 may be a service provider to the merchant payment system 308 enabling transaction of the amount between the issuer bank and an acquirer bank. Upon completion of the transaction, an acknowledgement for the completion along with the product ID 206 may be transferred to the merchant payment system 308. In some non-limiting embodiments or aspects, the merchant payment system 308 may be associated with the merchant of the physical store. The merchant payment system 308 may include an interoperable wallet associated with the merchant and may be configured to receive funds for the payment of the product. In some non-limiting embodiments or aspects, when the acknowledgement for the completion of the payment is received, the merchant payment system 308 may be configured to generate the confirmation data 205. In some non-limiting embodiments or aspects, as shown in FIG. 3e, the merchant payment system 308 may be in communication with the issuer system 304. When the payment is approved by the acquirer system 306 and the payment acceptance message is shared with the issuer system 304 via the payment network 305, the issuer system 304 may be configured to share the payment acceptance message to the merchant payment system 308, along with the product ID 206. In some non-limiting embodiments or aspects, upon receipt of the payment acceptance message, the merchant payment system 308 may be configured to generate the confirmation data 205.

From the exemplary embodiments illustrated in FIGS. 3c, 3d, and 3e, either the acquirer system 306 or the merchant payment system 308 may be configured to generate the confirmation data 205. In some non-limiting embodiments or aspects, upon receipt of the payment acceptance message, the acquirer system 306 or the payment network 305 may also generate the confirmation data 205. Generation of the confirmation data 205 may indicate the payment for the product to be authorized or complete.

The data and ID reception module 201 of the system 101 may be configured to receive the confirmation data 205 and the product ID 206 associated with the product from the payment system 104, as shown in FIG. 3b. In some non-limiting embodiments or aspects, the data and ID reception module 201 may be in communication with at least one of the issuer system 304, the payment network 305, the acquirer system 306, and the merchant payment system 308 to receive the confirmation data 205 and the product ID 206. In some non-limiting embodiments or aspects, the system 101, along with the data and ID reception module 201, may be an integral part of the inventory database 103. In some non-limiting embodiments or aspects, the system 101, along with the data and ID reception module 201, may be interfaced between the payment system 104 and the inventory database 103 to receive the confirmation data 205 from the payment system 104. From the previously-provided example, when the payment is authorized for the second product 301.2, the data and ID reception module 201 of the system 101 may be configured to receive the confirmation data 205 and the second product ID.

Further, in real-time, the inventory database update module 202 of the system 101 may be configured to update the inventory database 103 of the physical store with the confirmation data 205 and the product ID 206. In some non-limiting embodiments or aspects, the confirmation data 205 and the product ID 206 may be updated in the inventory database 103 as a PATCH request. In some non-limiting embodiments or aspects, by updating, the product in the inventory database 103 may be mapped to a "Paid" attribute. In some non-limiting embodiments or aspects, by the updating, the "Paid" attribute may be marked to be "True" for the product in the physical store with the product ID 206. Updating may include updates in the inventory database 103 to indicate that the payment for the product is successful. Thus, for the payment of the second product 301.2, the second product 301 may be marked to be purchased in the inventory database 103. When the user is purchasing multiple products, payment of each of the other products may be processed and corresponding confirmation data 205 generated. Also, the confirmation data 205 and the product ID 206 for each of the other products is also updated in the inventory database 103. One or more techniques, known to a person skilled in the art, may be implemented to perform the updating. In some non-limiting embodiments or aspects, the system 101, along with the inventory database update module 202, may be an integral part of the inventory database 103. In some non-limiting embodiments or aspects, the system 101, along with the inventory database update module 202, may be interfaced between the payment system 104 and the inventory database 103.

Figure 3F:
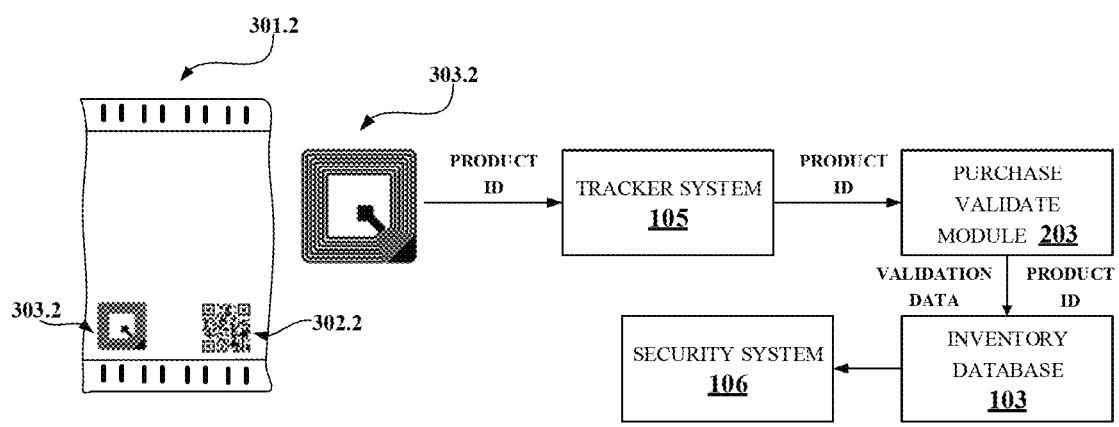

When the user is exiting the physical store, the purchase validate module 203 of the system 101 may be configured to validate the purchase of the product using the product ID 206 and the updated inventory database 103. As shown in FIG. 3f, the tracker system 105 may be used to validate the purchase. In some non-limiting embodiments or aspects, the tracker system 105 may be implemented at the exit of the physical store. In real-time, when the user is exiting the physical store with the purchased product, the purchase validate module 203 of the system 101 may be configured to obtain the product ID 206 from the product using the tracker system 105. In some non-limiting embodiments or aspects, the purchase validate module 203 of the system 101 may be configured to scan the tag associated with the product using a scanner of the tracker system 105. By scanning, the product ID 206 embedded in the tag may be obtained by the tracker system 105. In some non-limiting embodiments or aspects, the tag may be an RFID tag. The tracker system 105 may be an RFID-based tracker system 105. The scanner of the tracker system 105 may be configured to emit RF signals onto the product, incident on the tag. Reflected RF signals are received and processed to extract the product ID 206. For the second product 301.2, which is purchased by the user, the tag 303.2 is scanned by the tracker system 105 to obtain the second product ID. When the user is carrying more than one product from the physical store, the tracker system 105 may be configured to scan the tag associated with each of the products and obtain product ID 206 of all of the products. In some non-limiting embodiments or aspects, the tracker system 105 may implement any other technique, known to a person skilled in the art, to obtain the product ID 206 from the product. In some non-limiting embodiments or aspects, the tracker system 105 may also comprise or be part of a surveillance system.

Upon obtaining the product ID 206 by the tracker system 105, the purchase validate module 203 may be configured to obtain the product ID 206 from the tracker system 105. In some non-limiting embodiments or aspects, the system 101 along with the purchase validate module 203 may be implemented in the inventory database 103. In some non-limiting embodiments or aspects, the tracker system 105 may provide the obtained product ID 206 by calling a GET request to the purchase validate module 203. The purchase validate module 203 may be configured to compare the product ID 206 with the product ID updated along with the confirmation data 205 in the inventory database 103. In some non-limiting embodiments or aspects, by the comparison, the purchase validate module 203 may be configured to check if the purchase of the product is authorized. In some non-limiting embodiments or aspects, for the comparison, the purchase validate module 203 may be configured to identify the product from each of the plurality of products in the inventory system using the product ID 206.

Upon identifying the product, the "Paid" attribute of the product may be checked for determining whether the purchase is a valid purchase or an invalid purchase. In some non-limiting embodiments or aspects, the purchase may be determined to be the valid purchase when the product ID 206 is found to be updated with the confirmation data 205 in the inventory database 103. For example, when the "Paid" attribute is marked as "True", the purchase of the product may be determined to be a valid purchase. In some non-limiting embodiments or aspects, the purchase may be determined to be an invalid purchase when the product ID 206 is not found to be updated with the confirmation data 205 in the inventory database 103. For example, when the "Paid" attribute is marked as "False", the purchase of the product may be determined to be an invalid purchase. The output of the validation may be stored as the validation data 207 in the memory 109. When the user is carrying more than one product and exiting the physical store, the tracker system 105 may be configured to scan the tag of each of the products carried by the user and obtain the product ID 206 of every product. The validation for each of the products is performed using the respective product ID 206 to determine the purchase of each of the products to be a valid purchase or an invalid purchase.

In some non-limiting embodiments or aspects, the purchase validate module 203 may be configured to provide the output of the validation to the security system 106. In some non-limiting embodiments or aspects, the security system 106 may be configured to restrict the user from exiting the physical store. For example, the security system 106 may be gantry gates deployed at the exit of the physical store. The security system 106 may be enabled or disabled based on the output of the validation. When the purchase is determined to be a valid purchase, the security system 106 may be disabled. For example, the gantry gates may be controlled to open to allow the user to exit the physical store when the purchase is determined to be a valid purchase. Similarly, when the purchase is determined to be an invalid purchase, the security system 106 may be enabled. For example, the gantry gates may be controlled to close or remain closed to restrict the user from exiting the physical store when the purchase is determined to be an invalid purchase.

In some non-limiting embodiments or aspects, the security system 106 may include the alarm system and/or user equipment. When the purchase is determined to be an invalid purchase, the security system 106 may be configured to use the alarm system to provide a notification related to the invalid purchase in the physical store. The notification using the alarm system may be in the form any audio or visual signal/output, e.g., a siren, speech, and the like. One or more other forms of notification may also be provided using the alarm system when the purchase is determined to be an invalid purchase. In some non-limiting embodiments or aspects, the notification may be provided to the user equipment when the purchase is determined to be an invalid purchase. In some non-limiting embodiments or aspects, the user equipment may be handled by a security guard or authorized personnel in the physical store. In some non-limiting embodiments or aspects, the user equipment may be a display unit placed at the exit of the physical store. The notification may be in form of message indicating the invalid purchase, which is sent to the user equipment. When multiple products carried by the user are validated, and only a single product is associated with an invalid purchase, the security system 106 may be enabled.

In some non-limiting embodiments or aspects, the security system 106 may be part of the tracker system 105 or may be in communication with the tracker system 105 (not shown in figure). The validation data 207 from the purchase validate module 203 may be communicated with the tracker system 105, and the tracker system 105 may be configured to control the security system 106 based on the validation data 207. In some non-limiting embodiments or aspects, the system 101 along with the purchase validate module 203 may be implemented in either the tracker system 105 or the security system 106 to validate the purchase.

The other data 208 may comprise data, including temporary data and temporary files, generated by modules for performing the various functions of the system 101. The one or more modules 110 may also include other modules 204 to perform various miscellaneous functionalities of the system 101. It will be appreciated that such modules may be represented as a single module or a combination of different modules.

Figure 4A:
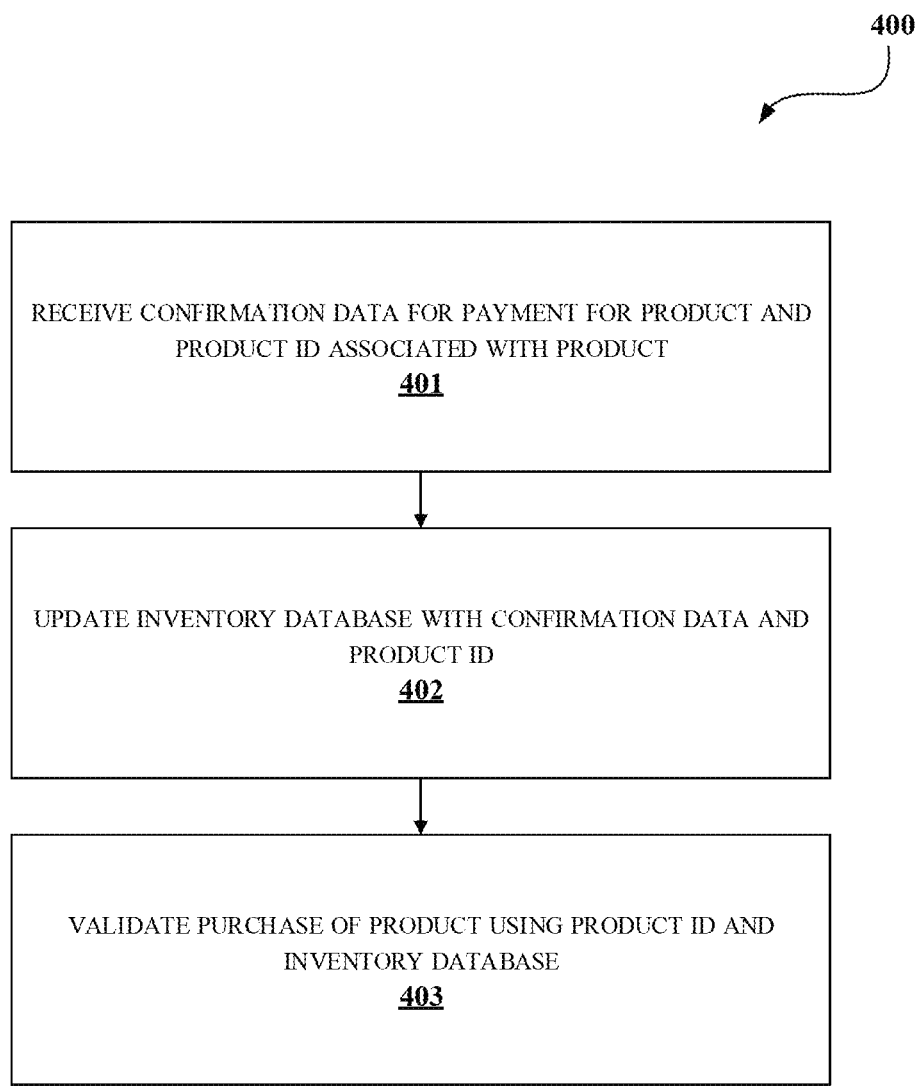
FIGS. 4a-4c illustrate flowcharts showing exemplary methods for validating a purchase of a product in a physical store, in accordance with some non-limiting embodiments or aspects of present disclosure.

FIG. 4a illustrates a flowchart showing an exemplary method to validate purchase of the product in the physical store, in accordance with some non-limiting embodiments or aspects of present disclosure. The proposed method is implemented in a cashier-less physical store, where the user needs to self-pay for purchase of products and self-checkout with the purchased products. Each of the plurality of products may be associated with the product ID 206. In some non-limiting embodiments or aspects, the product ID 206 associated with each of the plurality of products is unique. The plurality of products are labelled with a respective product ID 206 using computer-readable codes and tags embedded with the product ID 206.

Figure 4B:
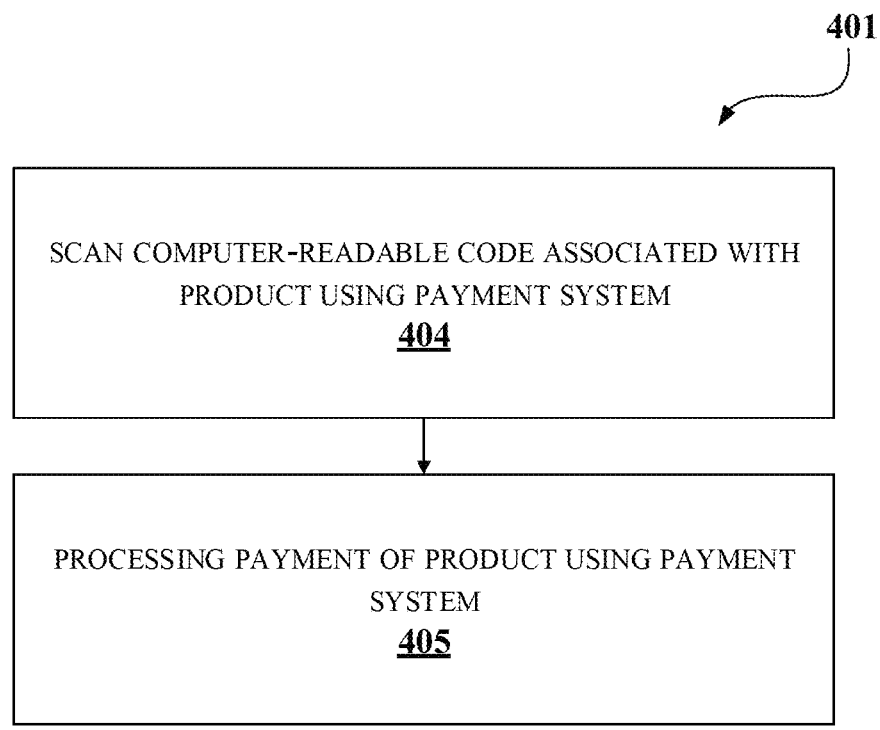

Initially, at step 401, the data and ID reception module 201 of the system 101 may be configured to receive the confirmation data 205 for the payment for the product and the product ID 206 associated with the product. The confirmation data 205 and the product ID 206 may be received upon purchase of the product by the user. FIG. 4b illustrates a flowchart showing an exemplary method for receiving the confirmation data 205 and the product ID 206, in accordance with some non-limiting embodiments or aspects of present disclosure. At step 404, the data and ID reception module 201 of the system 101 may be configured to initiate the purchase of the product using the payment system 104. In order to purchase the product, the user may scan the computer-readable code associated with the product using the payment system 104. By scanning, the payment system 104 may be configured to extract the product ID 206 of the product. In some non-limiting embodiments or aspects, along with the product ID 206, other data which may be embedded in the computer-readable code and required for processing the payment for the product may also be extracted.

At step 405, the data and ID reception module 201 of the system 101 may be configured to process the payment for the product using the received product ID 206 and the other data. In some non-limiting embodiments or aspects, the payment system 104 may be configured to generate the confirmation data 205 in response to authorization of the payment when the processing the payment. The data and ID reception module 201 may receive the generated confirmation data 205 along with the product ID 206 from the payment system 104.

Referring back to FIG. 4a, at step 402, upon receiving the confirmation data 205 and the product ID 206, the inventory database update module 202 of the system 101 may be configured to update an inventory database 103 of the physical store with the confirmation data 205 and the product ID 206. In some non-limiting embodiments or aspects, one or more techniques, known to a person skilled in the art, may be implemented to update the confirmation data 205 and the product ID 206 to the inventory database 103. At step 403, the purchase validate module 203 of the system 101 may be configured to validate the purchase of the product using the product ID 206 and the updated inventory database 103 using the tracker system 105. The validation may be performed when the user is exiting the physical store. In some non-limiting embodiments or aspects, the tracker system 105 may be implemented at the exit of the physical store. FIG. 4b illustrates a flowchart showing an exemplary method for validating the purchase of the product, in accordance with some non-limiting embodiments or aspects of present disclosure.

At step 406, the purchase validate module 203 of the system 101 may be configured to obtain the product ID 206 from the product using the tracker system 105 while the user is exiting the physical store. In some non-limiting embodiments or aspects, the purchase validate module 203 of the system 101 may be configured to scan a tag associated with the product using a scanner of the tracker system 105 to obtain the product ID 206 embedded in the tag. At step 407, upon obtaining the product ID 206, the purchase validate module 203 of the system 101 may be configured to compare the product ID 206 obtained via the tracker system 105 with the product ID 206 updated along with the confirmation data 205 in the inventory database 103. In some non-limiting embodiments or aspects, by the comparison, the purchase validate module 203 may be configured to check if the purchase of the product is authorized.

At step 408, in response to the comparison, the purchase validate module 203 of the system 101 may be configured to determine the purchase to be one of a valid purchase or an invalid purchase. In some non-limiting embodiments or aspects, the purchase may be determined to be the valid purchase when the product ID 206 is found to be updated with the confirmation data 205 in the inventory database 103. In some non-limiting embodiments or aspects, the purchase may be determined to be an invalid purchase when the product ID 206 is not found to be updated with the confirmation data 205 in the inventory database 103. In some non-limiting embodiments or aspects, based on the output of the validation, the security system 106, which is configured to restrict the user from exiting the physical store, may be one of enabled or disabled. For example, when the purchase is determined to be a valid purchase, the security system 106 may be disabled such that there may be no restriction for the user to exit the physical store. Similarly, when the purchase is determined to be an invalid purchase, the security system 106 may be enabled, such that there may be restriction for the user to exit the physical store. In some non-limiting embodiments or aspects, when the purchase is determined to be an invalid purchase, a notification related to the invalid purchase may be provided in the physical store. In some non-limiting embodiments or aspects, the notification may be provided using at least one of the alarm system in the physical store and the user equipment. In some non-limiting embodiments or aspects, the validation proposed in FIG. 4c may be performed for each product carried by the user when exiting the store.

Figure 4C:
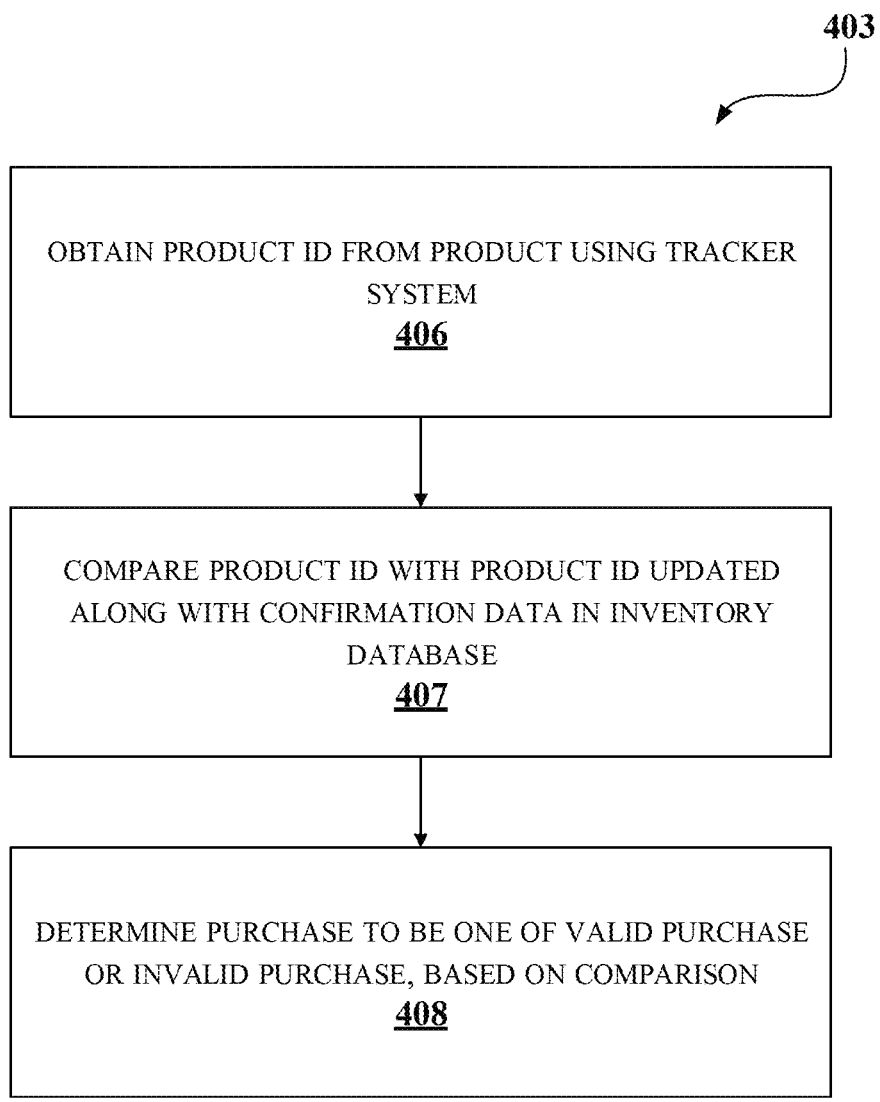

As illustrated in FIGS. 4a, 4b and 4c, the method steps 400, 401 and 403 may include one or more steps for executing processes in the system 101. The methods 400, 401 and 403 may be described in the general context of computer executable instructions. Generally, computer executable instructions can include routines, programs, objects, components, data structures, procedures, modules, and functions, which perform particular functions or implement particular abstract data types.

The order in which the method steps 400, 401 and 403 are described may not intended to be construed as a limitation, and any number of the described method steps can be combined in any order to implement the method. Additionally, individual steps may be deleted from the methods without departing from the scope of the subject matter described herein. Furthermore, the method can be implemented in any suitable hardware, software, firmware, or combination thereof.

Some non-limiting embodiments or aspects of the present disclosure efficient and secure means for cashier-less in-store check-out system that is fully operable with any payment system using computer-readable codes. Some non-limiting embodiments or aspects of the present disclosure provides reduced complexity in implementation, which manages the inventory of physical store and also takes care of security with respect to theft and shoplifting.

Computing System

Figure 5:
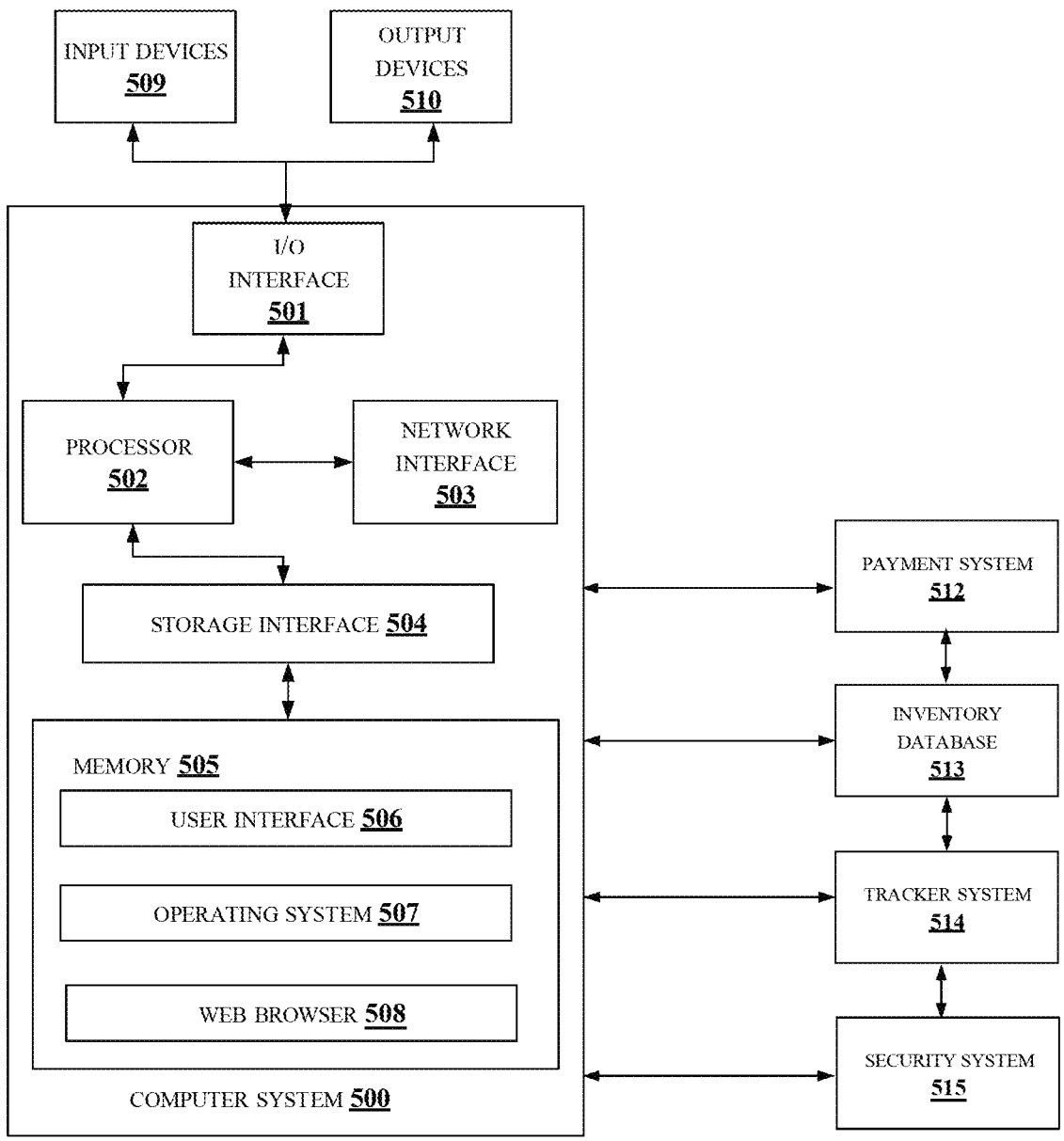
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In some non-limiting embodiments or aspects, the computer system 500 is used to implement the system 101 for validating purchase of the product. The computer system 500 may include a central processing unit ("CPU" or "processor") 502. The processor 502 may include at least one data processor for executing processes in Virtual Storage Area Network. The processor 502 may include specialized processing units such as, integrated system (bus) controllers, memory management control units, floating point units, graphics processing units, digital signal processing units, etc.

The processor 502 may be disposed in communication with one or more input/output (I/O) devices 509 and 510 via I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), radio frequency (RF) antennas, S-Video, VGA, IEEE 802.n/b/g/n/x, Bluetooth®, cellular (e.g., code-division multiple access (CDMA), high-speed packet access (HSPA+), global system for mobile communications (GSM), long-term evolution (LTE), WiMax®, or the like), and the like.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, and the like. The output devices 510 may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, and the like.

In some non-limiting embodiments or aspects, the computer system 500 may consist of the system 101. The processor 502 may be disposed in communication with a communication network (not shown in figure) via a network interface 503. The network interface 503 may communicate with the communication network. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface 503 and the communication network, the computer system 500 may communicate with at least one of a payment system 512, an inventory database 513, a tracker system 514, and a security system 515 associated with the physical store, for validating the purchase of the product. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network includes, but is not limited to, a direct interconnection, an e-commerce network, a peer to peer (P2P) network, a local area network (LAN), a wide area network (WAN), a wireless network (e.g., using Wireless Application Protocol), the Internet, Wi-Fi®, and the like. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, and the like.

In some non-limiting embodiments or aspects, the processor 502 may be disposed in communication with a memory 505 (e.g., RAM, ROM, and the like not shown in FIG. 5) via a storage interface 504. The storage interface 504 may connect to memory 505 including, without limitation, memory drives, removable disc drives, and the like, employing connection protocols, such as, serial advanced technology attachment (SATA), Integrated Drive Electronics (IDE), IEEE-1394, USB, fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, and the like.

The memory 505 may store a collection of program or database components, including, without limitation, user interface 506, an operating system 507, web browser 508, and the like. In some non-limiting embodiments or aspects, computer system 500 may store user/application data, such as the data, variables, records, etc., as described in this disclosure. Such databases may be implemented as fault-tolerant, relational, scalable, secure databases, such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT WINDOWS® (XP™, VISTA™/7/8, 10 etc.), APPLE® IOS™ GOOGLE® ANDROID™, BLACKBERRY® OS, or the like.

In some non-limiting embodiments or aspects, the computer system 500 may implement a web browser 508 stored program component. The web browser 508 may be a hypertext viewing application, such as Microsoft® Internet Explorer, Google Chrome®, Mozilla Firefox®, Apple Safari®, and the like. Secure web browsing may be provided using Hypertext Transport Protocol Secure (HTTPS), Secure Sockets Layer (SSL), Transport Layer Security (TLS), etc. Web browsers 508 may utilize facilities, such as AJAX, DHTML, Adobe Flash, JavaScript, Java, Application Programming Interfaces (APIs), and the like. In some non-limiting embodiments or aspects, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, Common Gateway Interface (CGI) scripts, Java, JavaScript, PERL, PHP, Python, WebObjects, and the like. The mail server may utilize communication protocols, such as Internet Message Access Protocol (IMAP), Messaging Application Programming Interface (MAPI), Microsoft® Exchange, Post Office Protocol (POP), Simple Mail Transfer Protocol (SMTP), or the like. In some non-limiting embodiments or aspects, the computer system 500 may implement a mail client stored program component. The mail client may be a mail viewing application, such as Apple® Mail, Microsoft Entourage®, Microsoft Outlook®, Mozilla Thunderbird®, and the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., be non-transitory. Examples include Random Access Memory (RAM), Read-Only Memory (ROM), volatile memory, non-volatile memory, hard drives, Compact Disc (CD) ROMs, DVDs, flash drives, disks, and any other known physical storage media.

The described operations may be implemented as a method, system, or article of manufacture using standard programming and/or engineering techniques to produce software, firmware, hardware, or any combination thereof. The described operations may be implemented as code maintained in a "non-transitory computer-readable medium", where a processor may read and execute the code from the computer-readable medium. The processor is at least one of a microprocessor and a processor capable of processing and executing the queries. A non-transitory computer-readable medium may include media, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, and the like), and the like. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), and the like).

An "article of manufacture" includes non-transitory computer readable medium and/or hardware logic in which code may be implemented. A device in which the code implementing the described embodiments of operations are encoded may include a computer-readable medium or hardware logic. Of course, those skilled in the art will recognize that many modifications may be made to this configuration without departing from the scope of the disclosure and that the article of manufacture may include suitable information bearing medium known in the art.

The terms "an embodiment", "embodiment", "embodiments", "the embodiment", "the embodiments", "one or more embodiments", "some non-limiting embodiments or aspects", and "one embodiment" mean "one or more (but not all) embodiments of the disclosure" unless expressly specified otherwise.

A description of an embodiment with several components in communication with each other does not imply that all such components are required. On the contrary, a variety of optional components is described to illustrate the wide variety of possible embodiments of the disclosure.

The terms "including", "comprising", "having", and variations thereof mean "including but not limited to" unless expressly specified otherwise. The enumerated listing of items does not imply that any or all of the items are mutually exclusive unless expressly specified otherwise. The terms "a", "an", and "the" mean "one or more" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The illustrated operations of FIGS. 4*a*, 4*b*, and 4*c* show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A computer-implemented method, comprising:

storing, in an inventory database of a physical store associated with a merchant, data for a plurality of products, the data for each product of the plurality of products comprising at least a product Identification Detail (ID);

storing the product ID for each product of the plurality of products on a separate radio frequency identification (RFID) tag;

mapping, in the inventory database, information associated with each product of the plurality of products to a corresponding product ID;

scanning, by a merchant payment system of the merchant, an RFID tag associated with a product to initiate a purchase of the product;

extracting, by the merchant payment system of the merchant, at least the product ID associated with the product from the scanned tag;

processing, by a payment network, a payment for the purchase of the product based on the product ID associated with the product, resulting in authorization of the payment;

generating, by the payment network, confirmation data, the confirmation data indicating that the payment for the purchase of the product is authorized;

receiving, by the merchant payment system of the merchant, the confirmation data and the product ID associated with the product from the payment network;

in response to receiving the confirmation data, updating, in real-time by the merchant payment system, the inventory database of the physical store with the confirmation data and the product ID associated with the product, wherein updating the inventory database comprises recording the product ID associated with the product in the inventory database in association with the confirmation data in real-time relative to receiving the confirmation data;

validating, by a tracker system of the merchant payment system, the purchase of the product in real-time while a user is exiting the physical store using the product ID associated with the product and the updated inventory database in response to the user exiting the physical store, wherein the tracker system is located at an exit of the physical store, wherein the tracker system is configured to emit radio frequency (RF) signals, and wherein validating the purchase comprises:

emitting, by the tracker system, RF signals while the user is exiting the physical store with the product;

receiving, by the tracker system, RF signals reflected from the RFID tag associate with the product based on the emitted RF signals;

obtaining the product ID associated with the product from the RF signals received from the RFID tag of the product using the tracker system while the user is exiting the physical store with the product;

comparing the product ID associated with the product obtained via the tracker system with the product ID associated with the confirmation data in the updated inventory database to determine whether the product ID associated with the product matches the product ID associated with the confirmation data in the updated inventory database; and in response to determining that the product ID associated with the product matches the product ID associated with the confirmation data in the updated inventory database, determining the purchase to be a valid purchase; and in response to determining the purchase to be the valid purchase, disabling, by at least one processor of a merchant system, a security system in the physical store configured to restrict the user from exiting the physical store, wherein the merchant system is in communication with the payment network and comprises the merchant payment system, the tracker system, and the security system.

2. The computer-implemented method of claim 1, further comprising:

in response to determining that the product ID associated with the product does not match the product ID associated with the confirmation data in the updated inventory database, determining, by the at least one processor, the purchase to be an invalid purchase, wherein determining the purchase to be the invalid purchase comprises:

enabling, with the at least one processor, the security system configured to restrict the user from exiting the physical store.

3. The computer-implemented method of claim 2, wherein determining the purchase to be the invalid purchase comprises providing, by the at least one processor, a notification related to the invalid purchase using at least one of an alarm system in the physical store and user equipment.

4. The computer-implemented method of claim 1, wherein obtaining the product ID associated with the product using the tracker system comprises:

scanning, with a scanner of the tracker system, the RFID tag associated with the product using a scanner of the tracker system to obtain the product ID embedded in the RFID tag.

5. A system, comprising:

one or more processors of an inventory database of a physical store associated with a merchant;

a first memory communicatively coupled to the one or more processors of the inventory database of the physical store, wherein the first memory stores processor-executable instructions, which, on execution, cause the one or more processors of a payment system in the physical store to:

store data for a plurality of products, the data for each product of the plurality of products comprising at least a product Identification Detail (ID);

store the product ID for each product of the plurality of products on a separate radio frequency identification (RFID) tag; and map information associated with each product of the plurality of products to a corresponding product ID;

one or more processors of a merchant system, wherein the merchant system is in communication with a payment network, and wherein the merchant system comprises a merchant payment system, a tracker system, and a security system; and a second memory communicatively coupled to the one or more processors of the merchant system, wherein the second memory stores processor-executable instructions, which, on execution, cause the one or more processors of the merchant system to:
scan, by the merchant payment system, an RFID tag associated with a product to initiate a purchase of the product; and
extract, by the merchant payment system, at least the product ID associated with the product from the scanned tag;
one or more processors of a payment network;
a third memory communicatively coupled to the one or more processors of the payment network, wherein the third memory stores processor-executable instructions, which, on execution, cause the one or more processors of the payment network to:
process a payment for the purchase of the product based on the product ID associated with the product, resulting in authorization of the payment;
generate confirmation data indicating that the payment for the purchase of the product is authorized; and
wherein the second memory stores processor-executable instructions, which, on execution, further cause the one or more processors of the merchant system to:
scan, by the merchant payment system, an RFID tag associated with a product to initiate the purchase of the product; and
extract, by the merchant payment system, at least the product ID associated with the product from the scanned tag;
receive, by the merchant payment system, the confirmation data and the product ID associated with the product from the payment network;
in response to receiving the confirmation data, update, in real-time by the merchant payment system, the inventory database of the physical store with the confirmation data and the product ID associated with the product, wherein updating the inventory database comprises recording the product ID associated with the product in the inventory database in association with the confirmation data in real-time relative to receiving the confirmation data;
validate, by the tracker system, the purchase of the product in real-time while a user is exiting the physical store using the product ID associated with the product and the updated inventory database in response to the user exiting the physical store, wherein the tracker system is located at an exit of the physical store, wherein the tracker system is configure to emit radio frequency (RF) signals, and wherein validating the purchase comprises:
emitting, by the tracker system, RF signals while the user is exiting the physical store with the product;
receiving, by the tracker system, RF signals reflected from the RFID tag associated with the product based on the emitted RF signals;
obtaining the product ID associated with the product from the RF signals received from the RFID tag of the product using the tracker system while the user is exiting the physical store with the product;
comparing the product ID associated with the product obtained via the tracker system with the product ID associated with the confirmation data in the updated inventory database to determine whether the product ID associated with the product matches the product ID associated with the confirmation data in the updated inventory database; and in response to determining that the product ID associated with the product matches the product ID associated with the confirmation data in the updated inventory database, determining the purchase to be one of: a valid purchase or an invalid purchase; and
in response to determining the purchase to be the valid purchase, disable a security system in the physical store configured to restrict the user from exiting the physical store, wherein the merchant system is in communication with the payment network and comprises the merchant payment system, the tracker system, and the security system.

6. The system of claim 5, wherein, in response to determining the purchase to be the invalid purchase, the one or more processors of the merchant system are configured to enable the security system configured to restrict the user from exiting the physical store.

7. The system of claim 5, wherein the one or more processors of the merchant system are configured to provide a notification related to the invalid purchase using at least one of an alarm system in the physical store and user equipment when the purchase is determined to be the invalid purchase.

8. The system of claim 5, wherein the one or more processors of the merchant system are configured to obtain the product ID associated with the product using the tracker system by:
scanning the RFID tag associated with the product using a scanner of the tracker system to obtain the product ID embedded in the RFID tag.

9. At least one non-transitory computer readable medium including instructions stored thereon that when processed by one or more processors cause at least one of a merchant system and a payment network to perform operations comprising:
storing, in an inventory database of a physical store associated with a merchant, data for a plurality of products, the data for each product of the plurality of products comprising at least a product Identification Detail (ID);
storing the product ID for each product of the plurality of products on a separate radio frequency identification (RFID) tag;
mapping, in the inventory database, information associated with each product of the plurality of products to a corresponding product Identification Detail (ID);
scanning, by a merchant payment system of the merchant, an RFID tag associated with a product to initiate a purchase of the product;
extracting, by the merchant payment system of the merchant, at least the product ID associated with the product from the scanned tag;
processing, by the payment network, a payment for the purchase of the product based on the product ID associated with the product, resulting in authorization of the payment;
generating, by the payment network, confirmation data indicating that the payment for the purchase of the product is authorized;
receiving, by the merchant payment system of the merchant, the confirmation data and the product ID associated with the product from the payment network;
in response to receiving the confirmation data, updating, in real-time by the merchant payment system, the inventory database of the physical store with the confirmation data and the product ID associated with the product, wherein updating the inventory database comprises recording the product ID associated with the product in the inventory database in association with the confirmation data in real-time relative to receiving the confirmation data;

validating, by a tracker system of the merchant payment system, the purchase of the product in real-time while a user is exiting the physical store using the product ID associated with the product and the updated inventory database in response to the user exiting the physical store, wherein the tracker system is located at an exit of the physical store, wherein the tracker system is configured to emit radio frequency (RF) signals, and wherein validating the purchase comprises:

emitting, by the tracker system, RF signals while the user is exiting the physical store with the product;

receiving, by the tracker system, RF signals reflected from the RFID tag associated with the product based on the emitted RF signals;

obtaining the product ID associated with the product from the RF signals received from the RFID tag of the product using the tracker system while the user is exiting the physical store with the product;

comparing the product ID associated with the product obtained via the tracker system with the product ID associated with the confirmation data in the updated inventory database to determine whether the product ID associated with the product matches the product ID associated with the confirmation data in the updated inventory database; and in response to determining that the product ID associated with the product matches the product ID associated with the confirmation data in the updated inventory database, determining the purchase to be one of: a valid purchase or an invalid purchase; and in response to determining the purchase to be the valid purchase, disabling, by at least one processor of a merchant system, a security system in the physical store configured to restrict the user from exiting the physical store, wherein the merchant system is in communication with the payment network and comprises the merchant payment system, the tracker system, and the security system.

10. The medium of claim 9, wherein, in response to determining the purchase to be the invalid purchase, the merchant system performs operations comprising: enabling the security system configured to restrict the user from exiting the physical store.

11. The medium of claim 9, wherein determining the purchase to be the invalid purchase comprises providing a notification related to the invalid purchase using at least one of an alarm system in the physical store and user equipment.

12. The medium of claim 9, wherein obtaining the product ID using the tracker system comprises:

scanning the RFID tag associated with the product using a scanner of the tracker system to obtain the product ID embedded in the RFID tag.

\* \* \* \* \*